Aug. 22, 1944.   M. H. HILL   2,356,319
METHOD AND APPARATUS FOR APPLYING CAP REMOVERS
TO BOTTLES OR LIKE CONTAINERS
Filed May 29, 1942   13 Sheets-Sheet 4
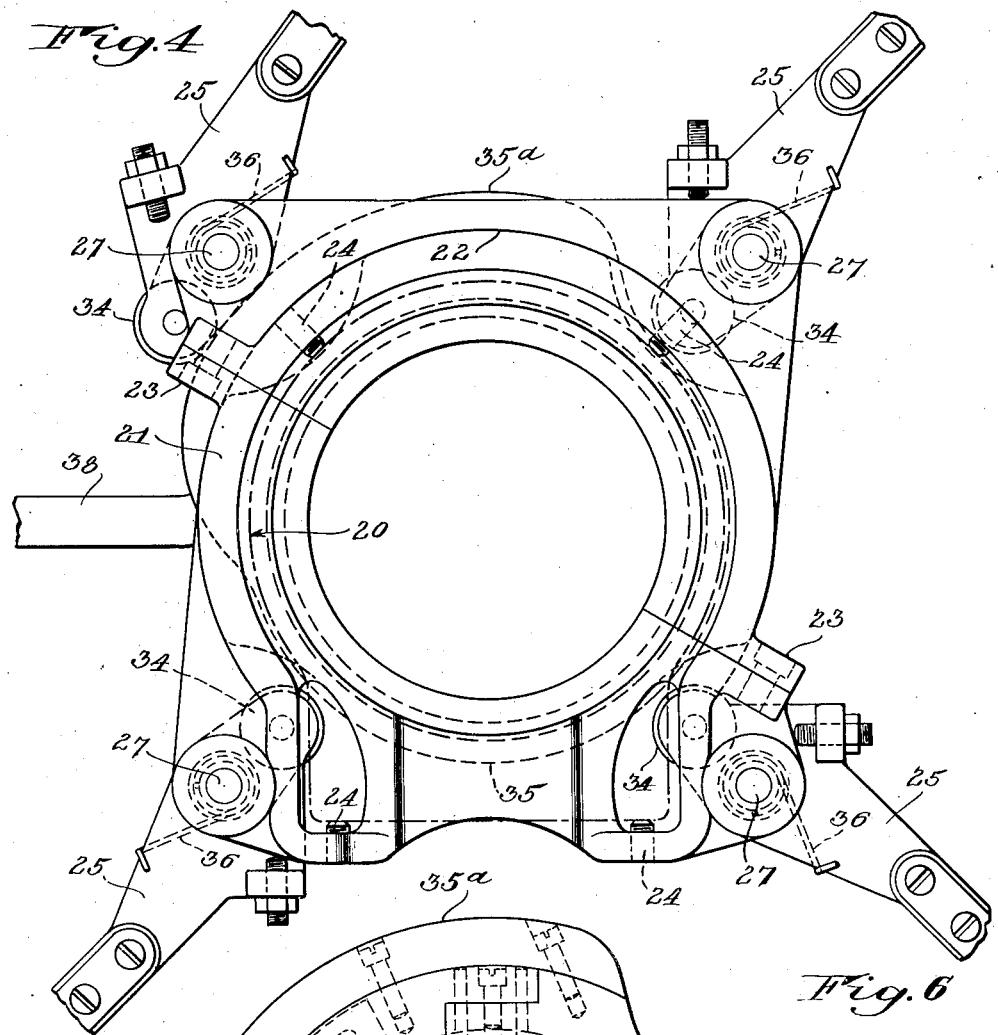
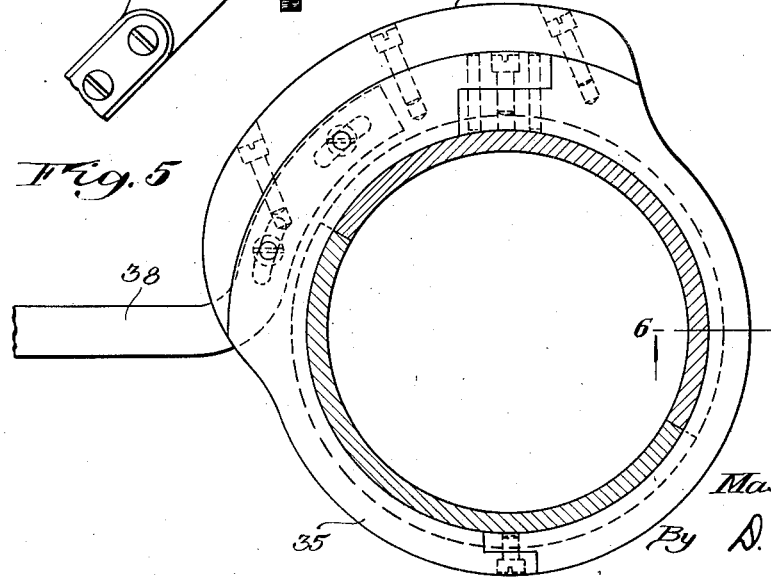
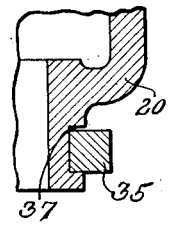
INVENTOR.
Maxwell H. Hill
By D. Clyde Jones
his ATTORNEY.

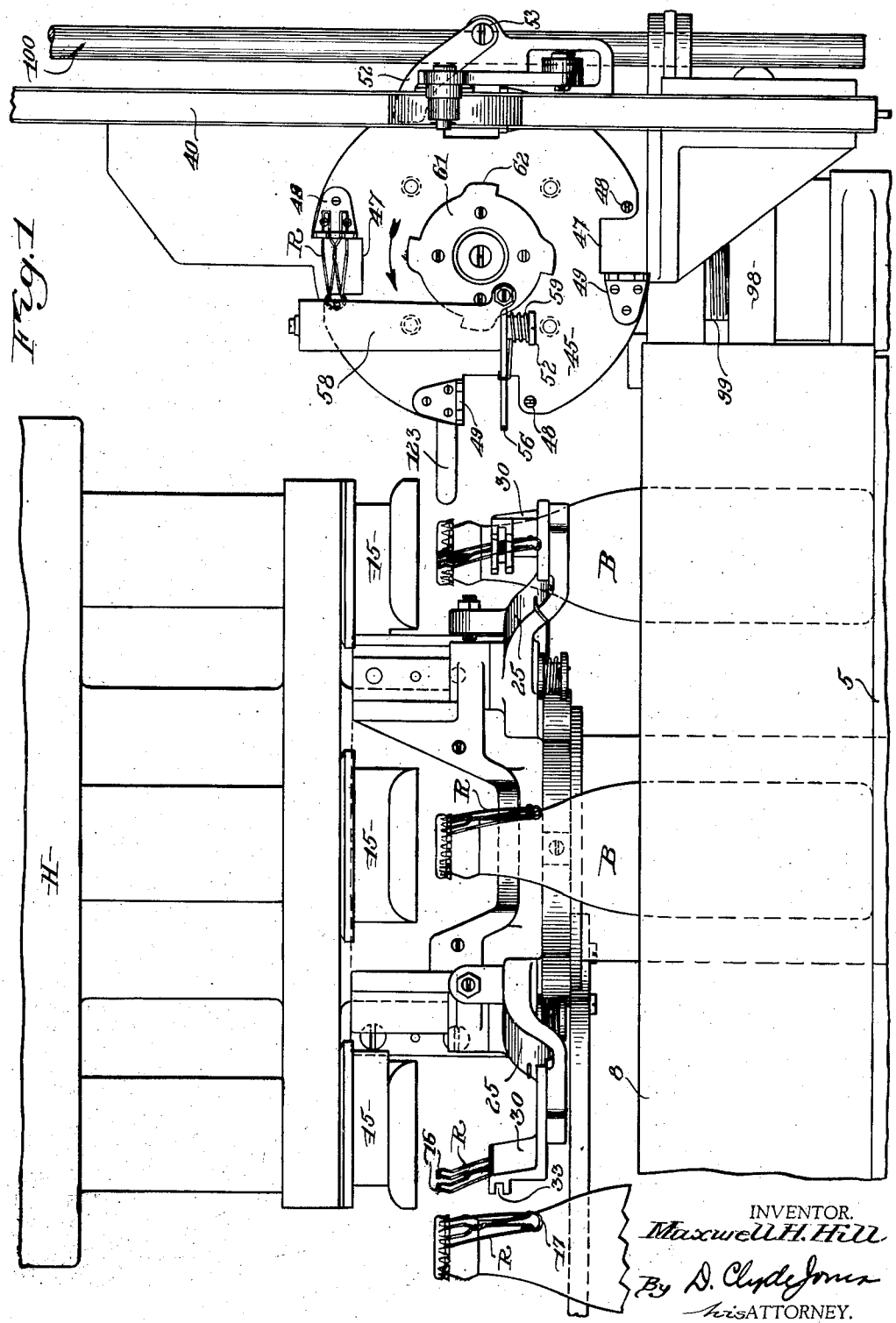

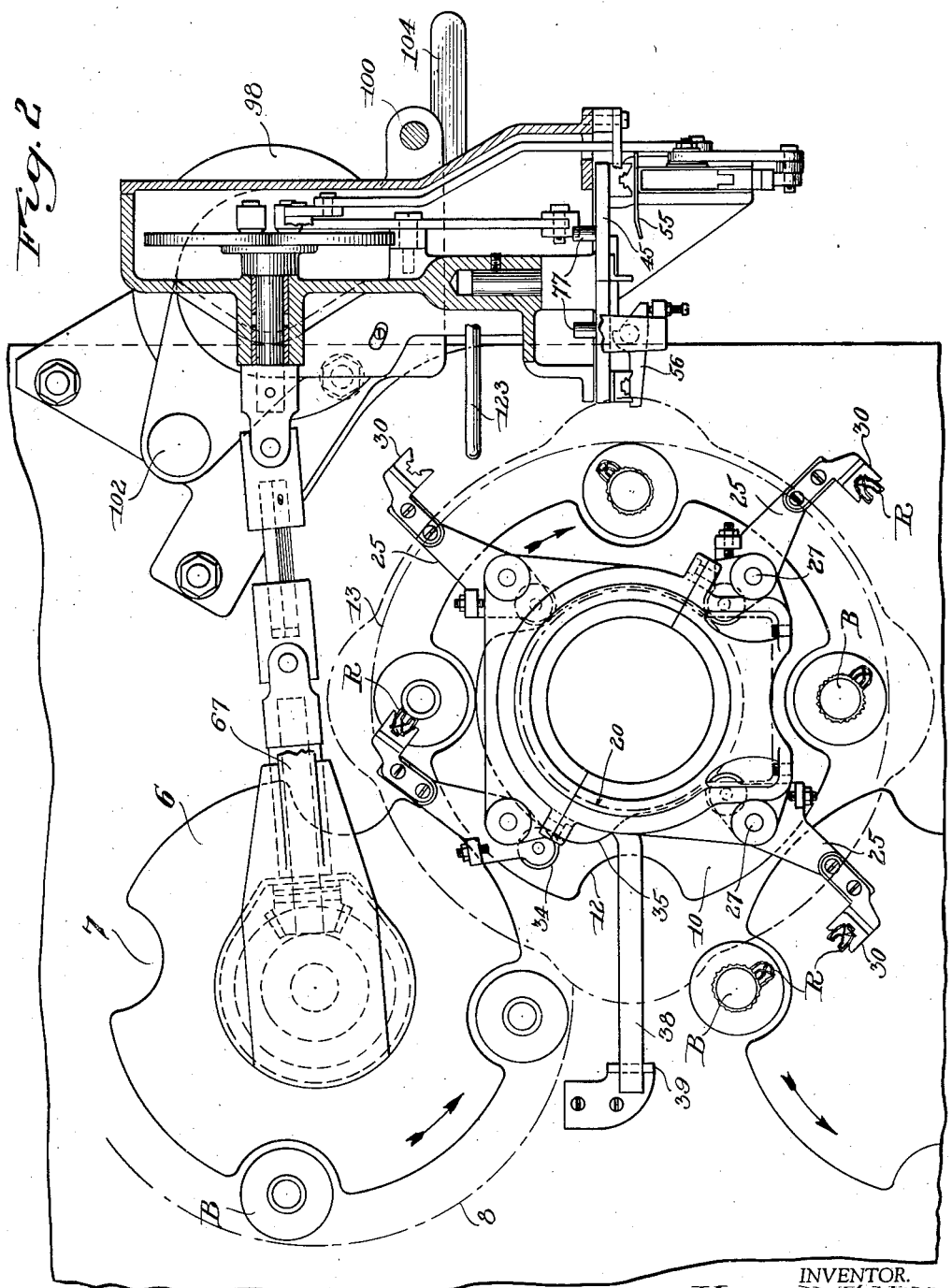

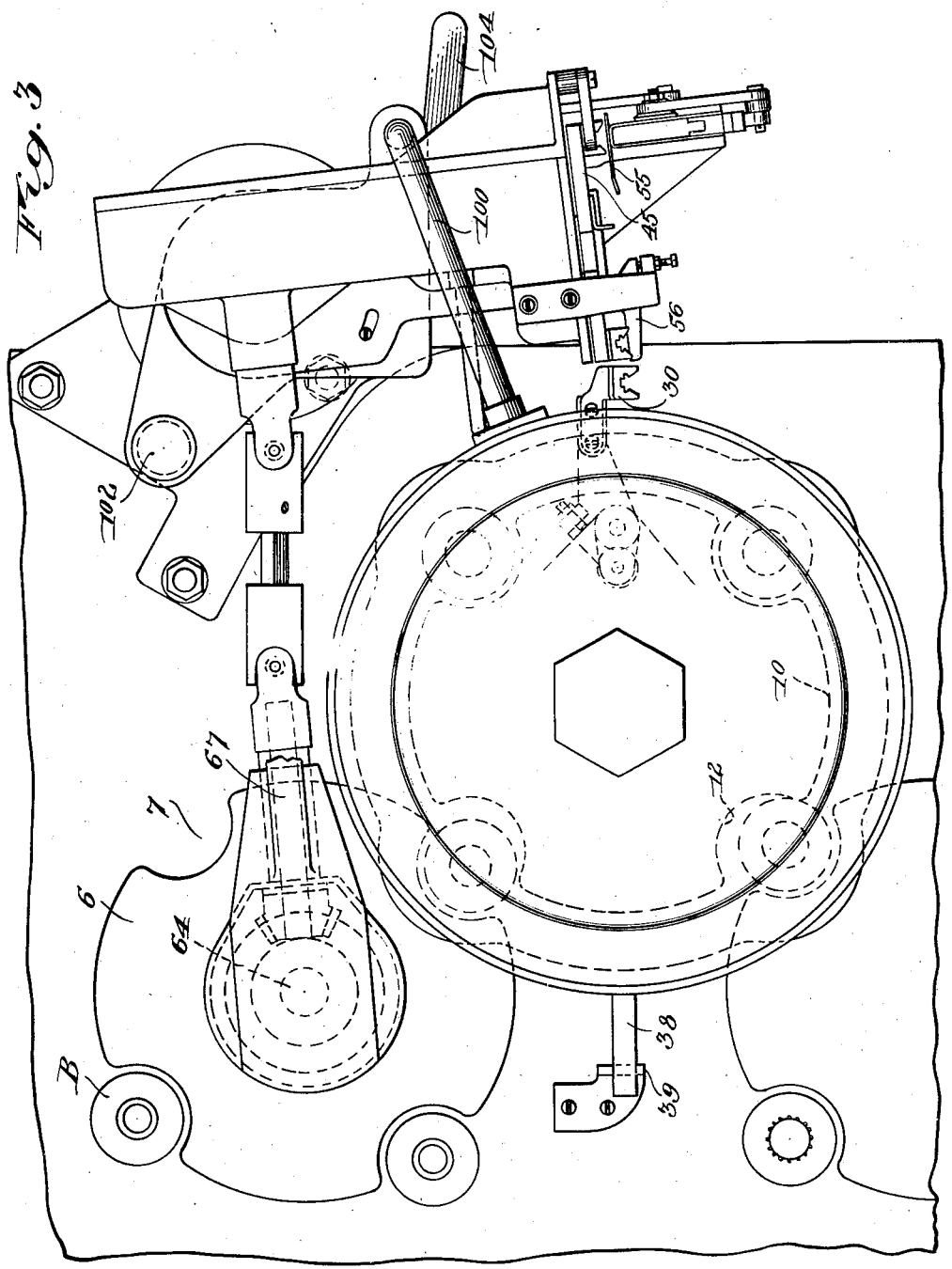

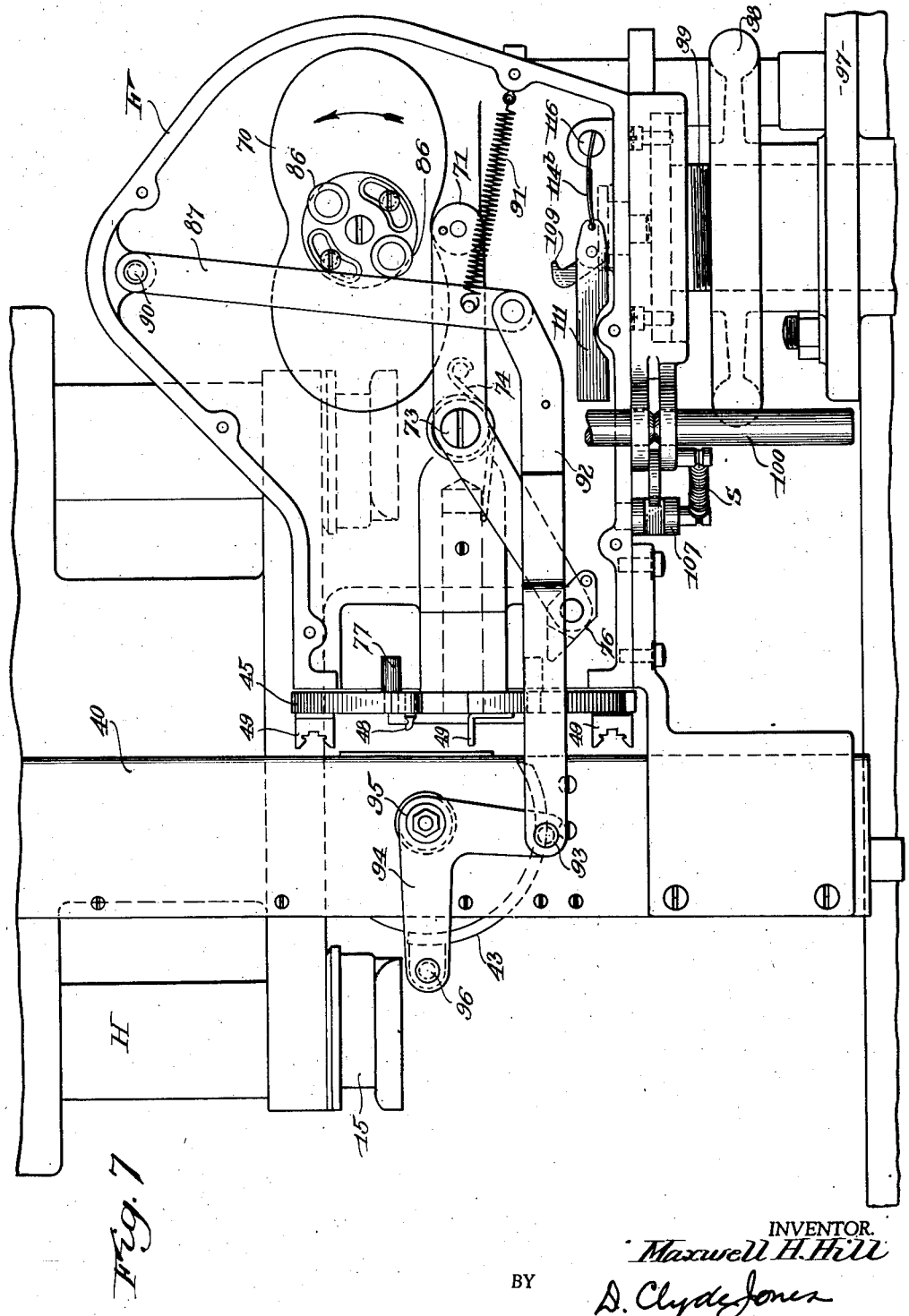

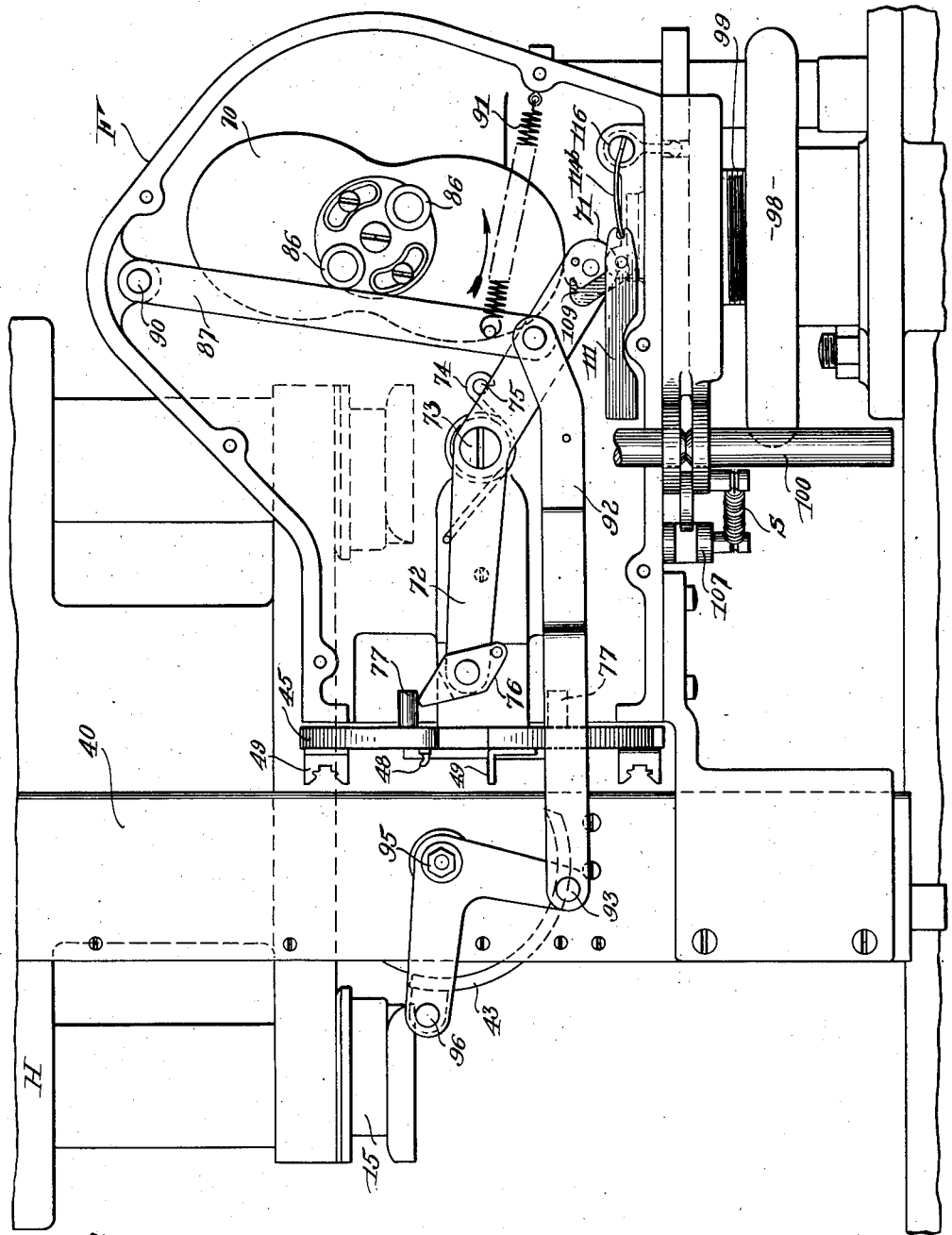

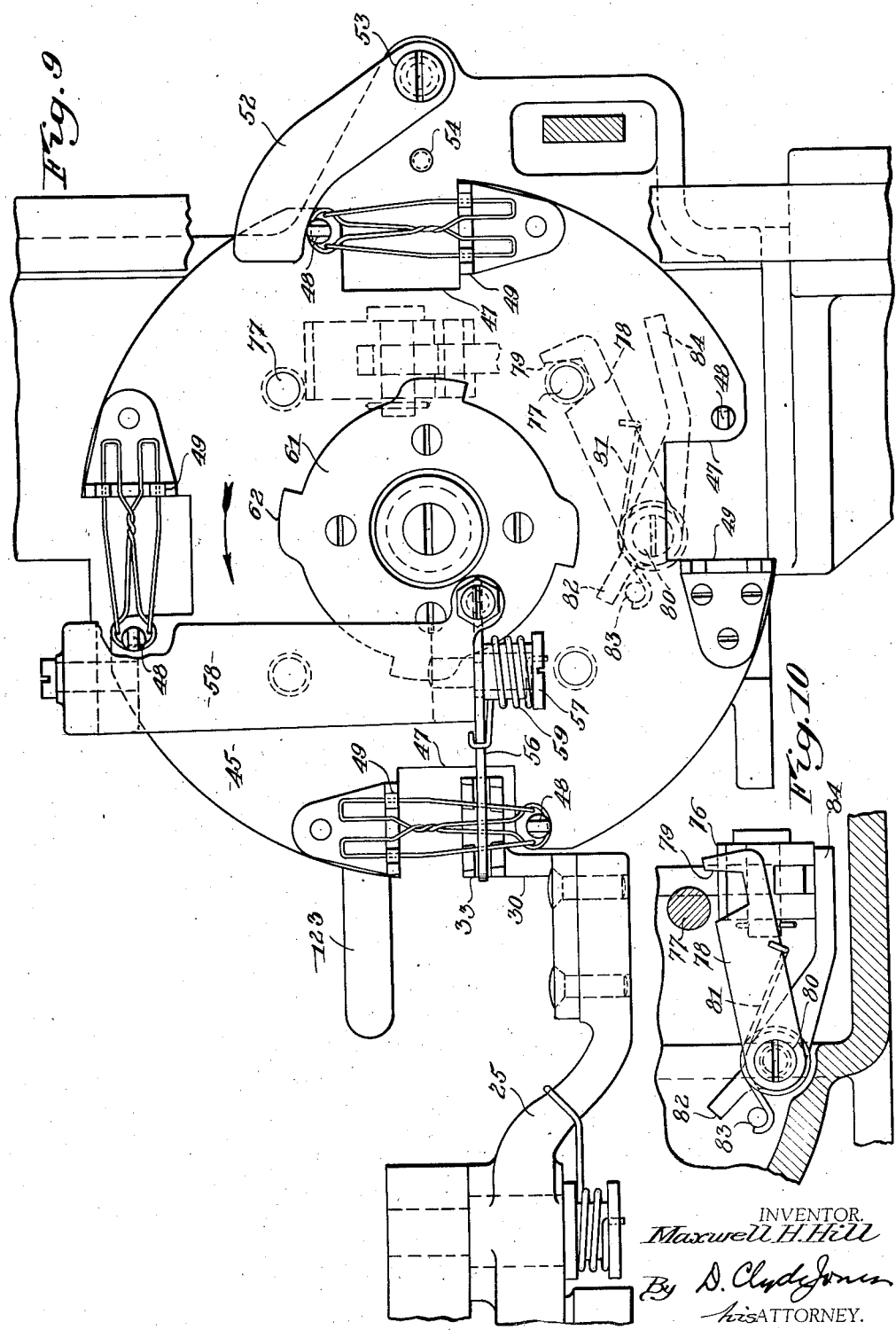

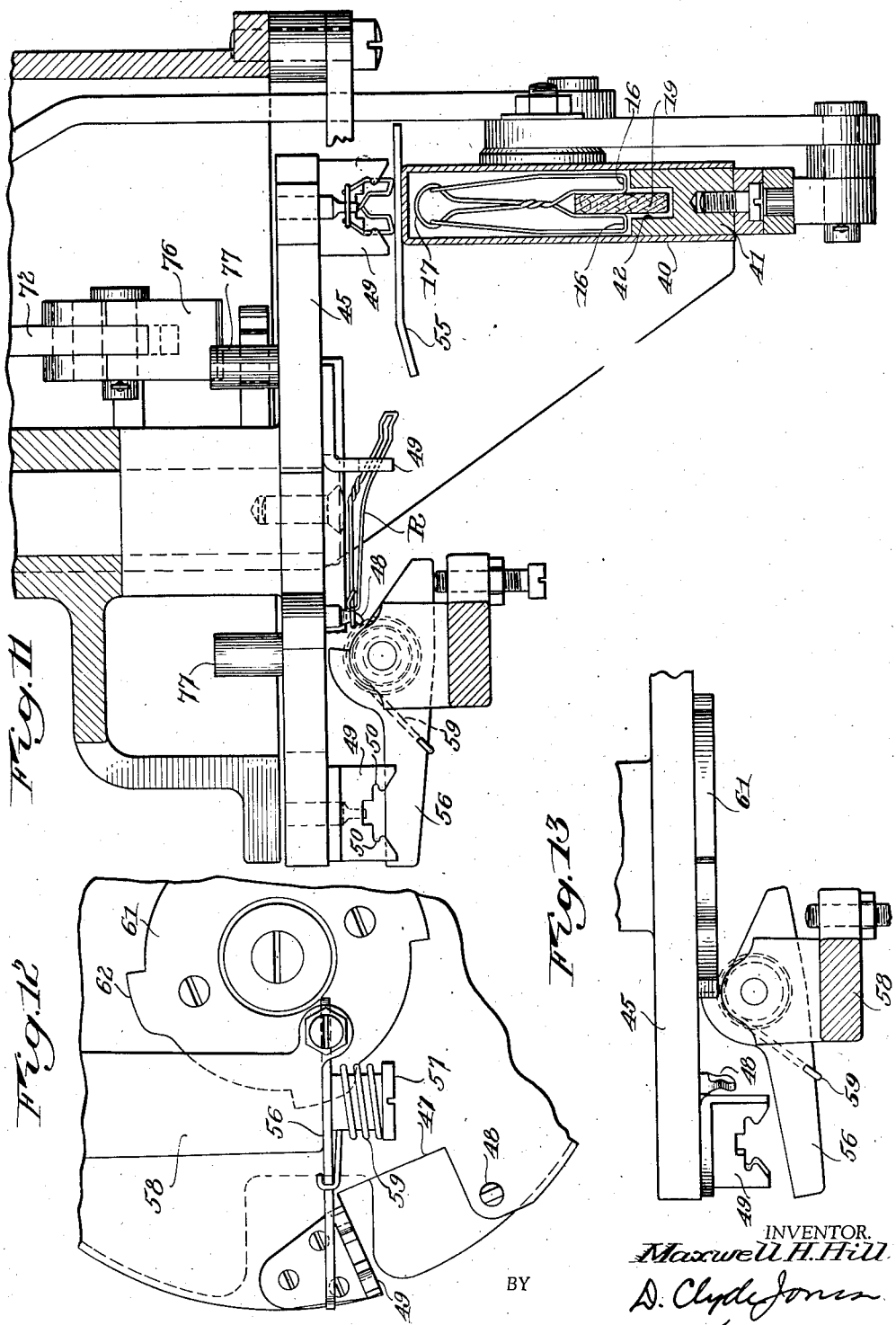

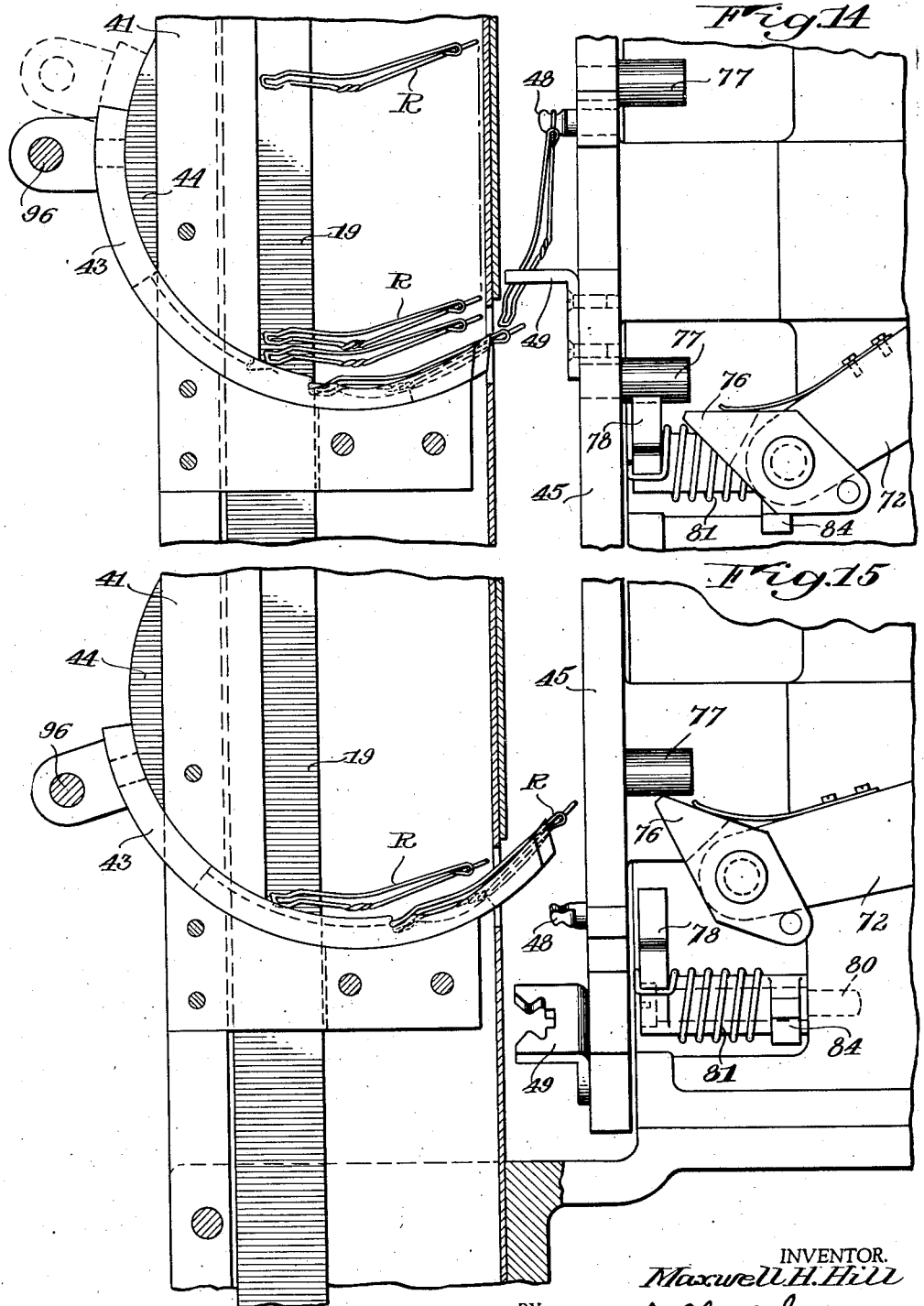

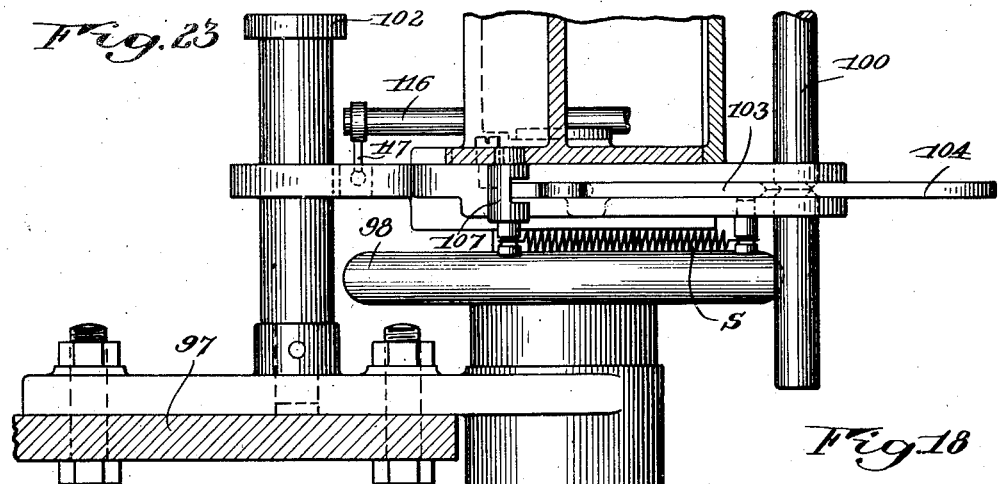
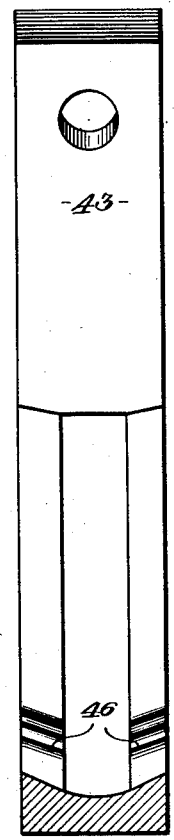
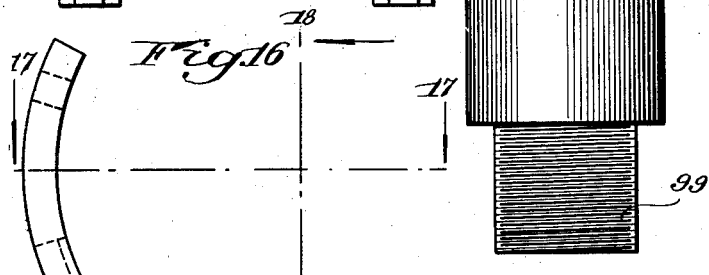
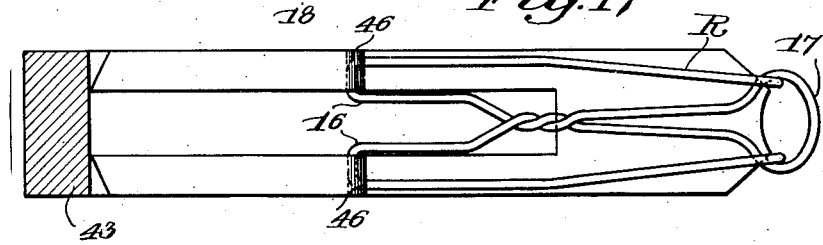

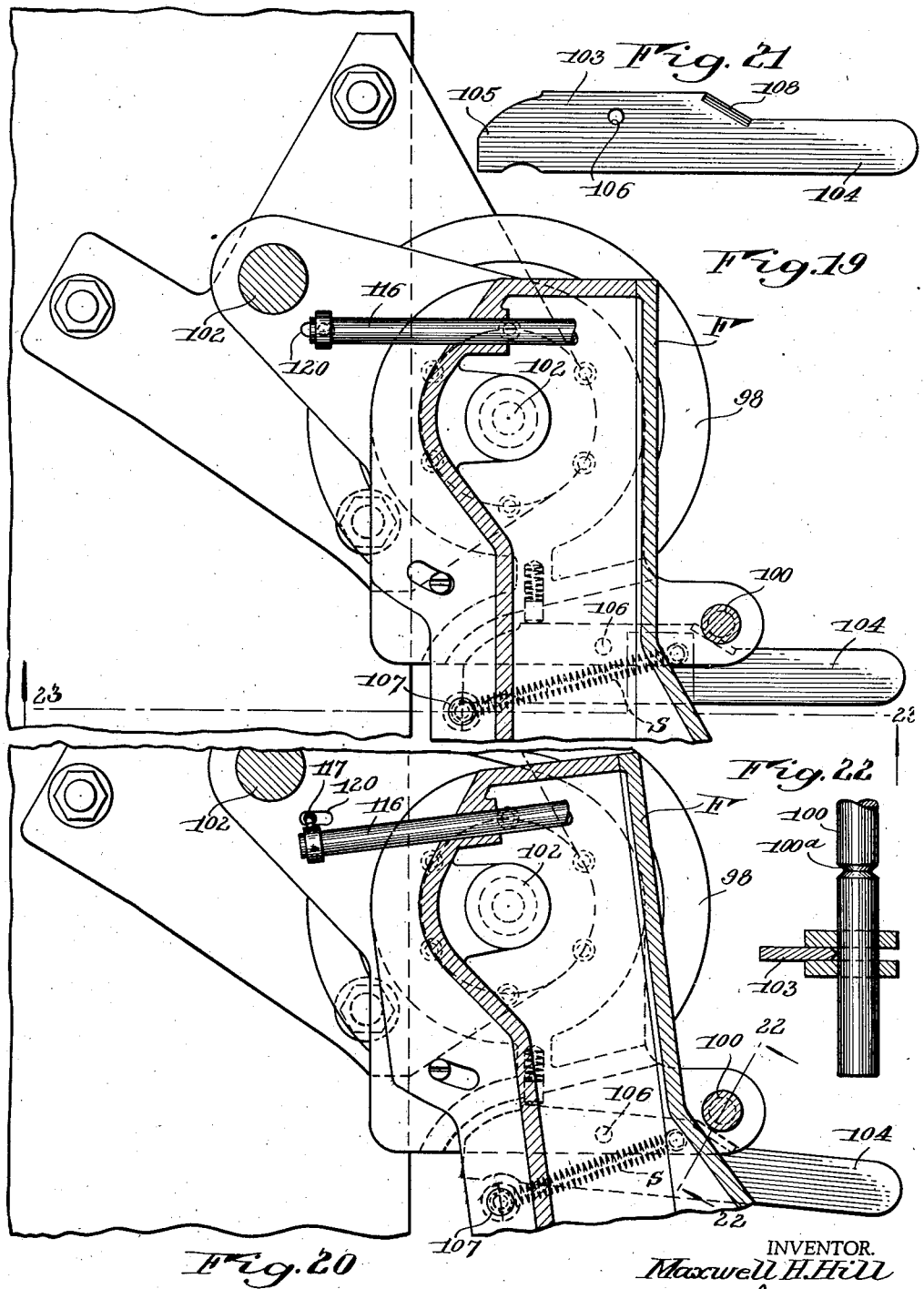

Aug. 22, 1944. M. H. HILL 2,356,319
METHOD AND APPARATUS FOR APPLYING CAP REMOVERS
TO BOTTLES OR LIKE CONTAINERS
Filed May 29, 1942 13 Sheets-Sheet 12
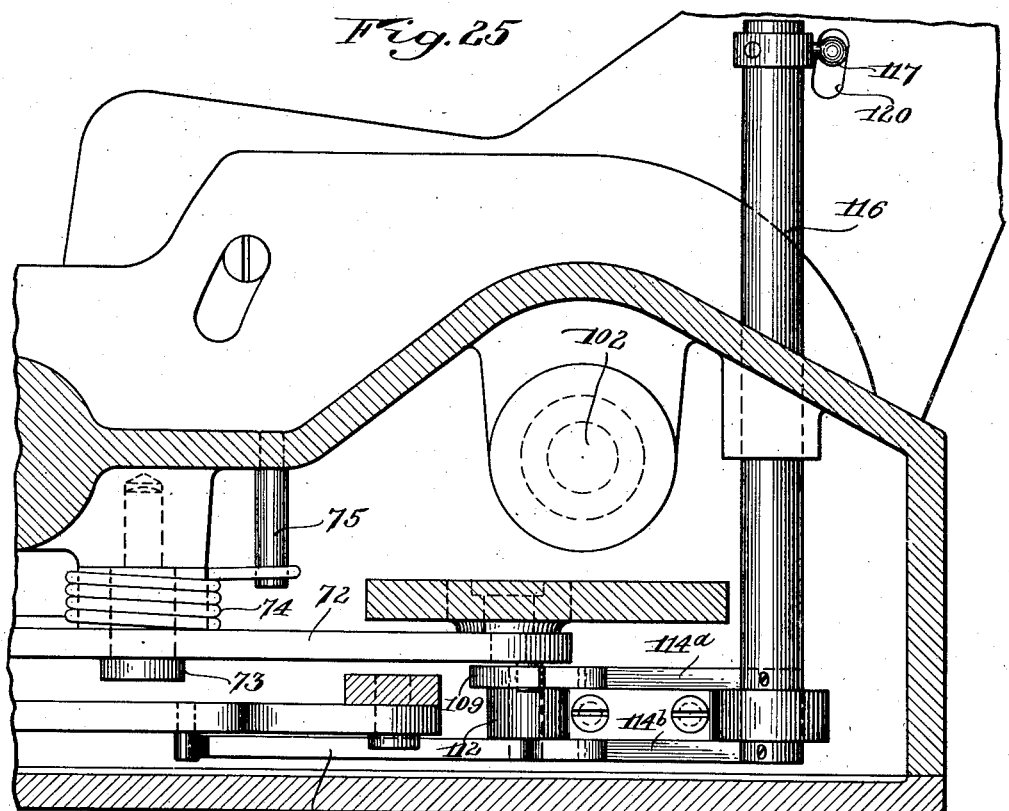
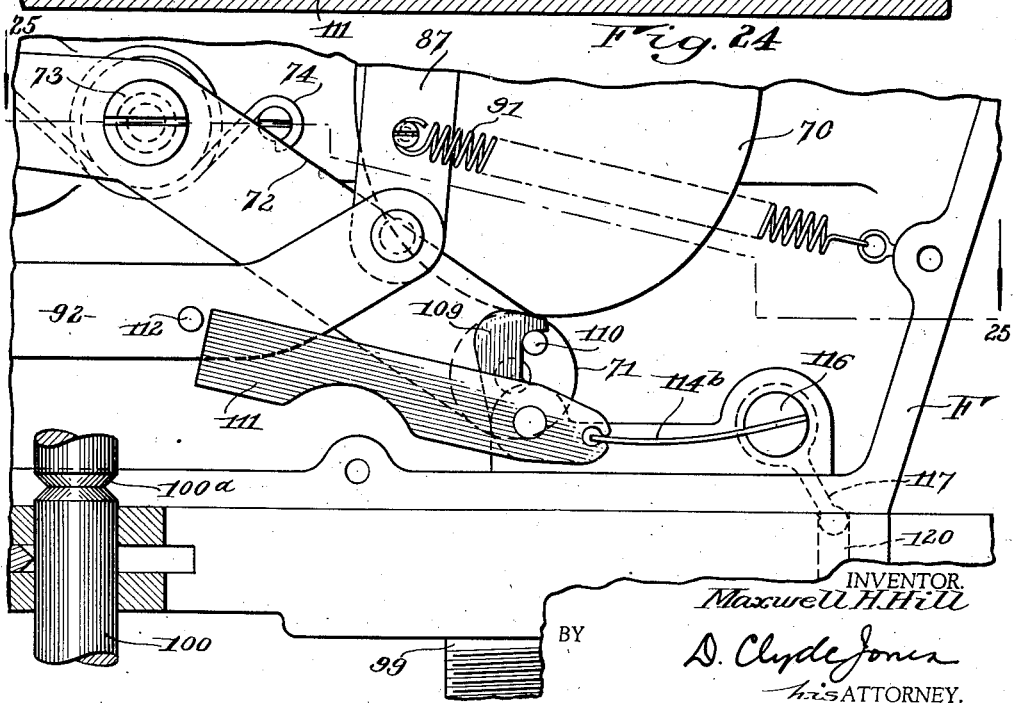
INVENTOR.
Maxwell H. Hill
BY D. Clyde Jones
his ATTORNEY.

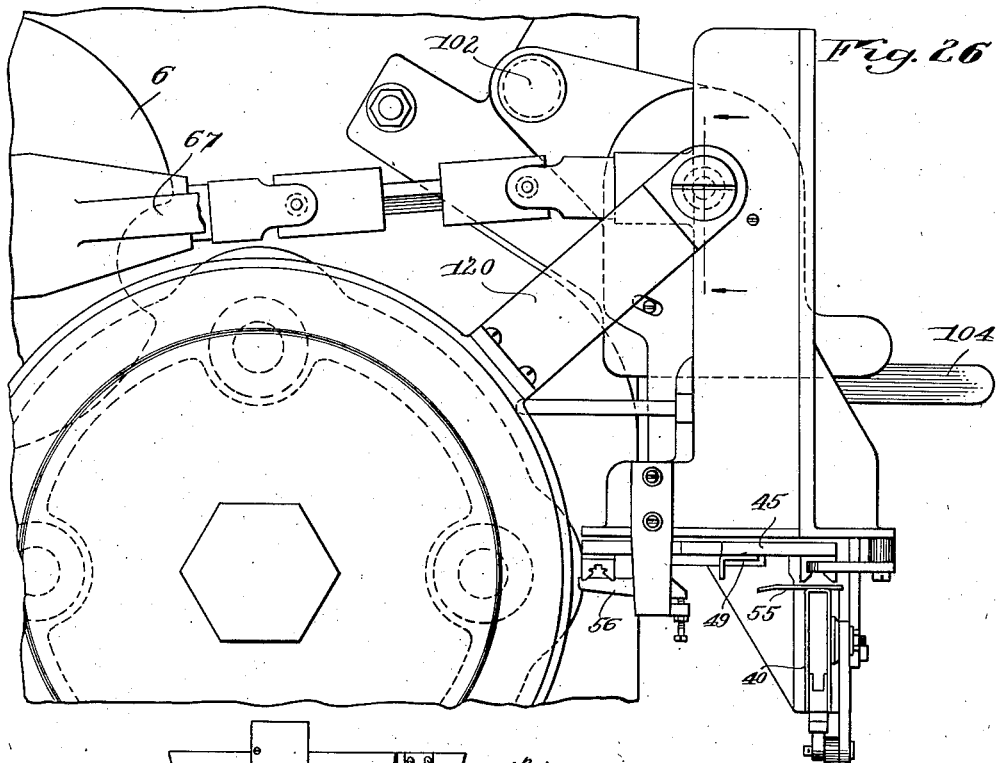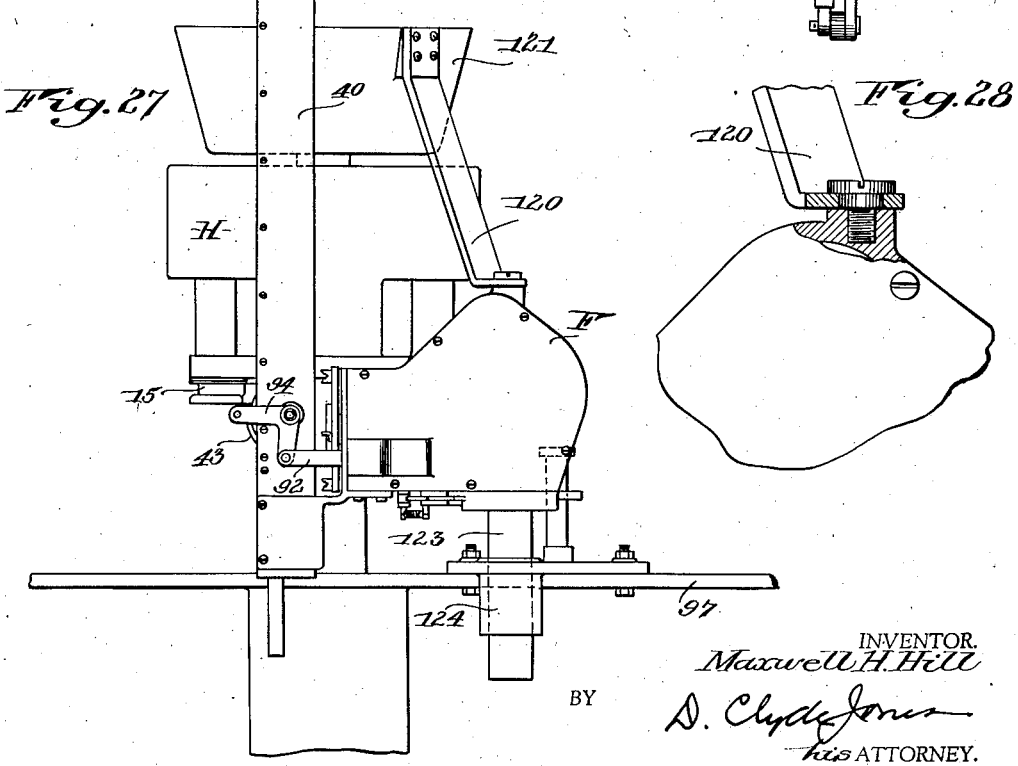

Patented Aug. 22, 1944

2,356,319

UNITED STATES PATENT OFFICE 2,356,319

METHOD AND APPARATUS FOR APPLYING CAP REMOVERS TO BOTTLES OR LIKE CONTAINERS

Maxwell H. Hill, Rochester, N. Y.

Application May 29, 1942, Serial No. 445,400

16 Claims. (Cl. 226—81)

This invention relates to a product including a series of cap removers and to a method of and to means employed in applying crown caps and said cap removers to bottles and containers.

In the Soukup et al. application, Serial No. 364,086, filed November 2, 1940, there is disclosed a container cap remover formed of wire and having spaced legs, the ends of which are adapted to be embraced between the lip of the container and the skirt or crimped portion of a crown cap applied thereto. Thus, each container or bottle carries its individual cap remover or opener. Before the present invention, such attaching of an individual cap remover under the crown cap on each bottle or container, has required that, prior to the capping operation, a cap remover be manually fastened to the neck of the container in a position to be embraced by the crimped cap.

In accordance with the main feature of the present invention, there is provided a method whereby a cap remover is automatically applied between the lip of each bottle or container and the skirt of a crown cap thereon, simultaneously with the capping operation.

Another feature of the invention relates to an apparatus wherein the cap removers are delivered from a hopper, magazine or the like and are automatically applied under the crimped caps of capped bottles or containers as they proceed through the capping machine.

These and other features of the invention will appear from the detailed description and claims when taken with the drawings in which:

Fig. 1 is a front elevation of the present invention combined with a conventional crown capping machine a part of which particularly the capping head together with carriers for presenting in succession cap removers to each bottle in the capping position are shown at the left of this figure, while at the right thereof there are illustrated a magazine and a rotor to which cap removers are supplied from the magazine and are then transferred from the rotor to the carriers on the capping head;

Fig. 2 is a plan view of the mechanism illustrated in Fig. 1, portions thereof being broken away for clearness in disclosure;

Fig. 3 is a plan view similar to Fig. 2 except that the magazine and its ejector together with the rotor are shown in inoperative position so that no cap removers can be delivered to the capping head;

Fig. 4 is an enlarged view illustrating the manner of mounting the carrier arms on the capping head as well as the stationary cam and the cam followers on each carrier arm whereby each carrier in succession is swung toward a bottle in the capping position;

Fig. 5 is a sectional view through the capping head showing more clearly the construction of the cam and the manner in which it is mounted on the capping head;

Fig. 6 is a detailed sectional view taken on the line 6—6 of Fig. 5 showing the portion of the rotatable capping head with a groove therein in which the cam is retained;

Figs. 7 and 8 are an end elevation of the machine, showing the magazine with its ejector and the rotor as well as the mechanism for driving the ejector and the rotor, the mechanism being shown in different operating positions in the respective figures;

Fig. 9 is a front elevation of the rotor and a carrier arm on the capping head particularly illustrating the transfer of a cap remover from the rotor to the carrier on a carrier arm rotating with the capping head;

Fig. 10 is a detailed view showing the latch mechanism which retains the rotor in one of its four stopping positions until such time as the latch is released just prior to an indexing movement of the rotor;

Fig. 11 is a horizontal section through the magazine and the frame supporting the magazine and rotor, particularly illustrating the mounting of the finger 56 which engages the front of a cap remover during its transfer from the carrier 49 on the rotor to a carrier 30 on one of the rotating carrier arms;

Figs. 12 and 13 are other views showing the mounting of this finger 56 as well as a cam 61 for operating the same;

Fig. 14 is a view showing an indexing pawl 76 in the position wherein it disengages the latching means of the rotor so that the rotor can be advanced a quarter revolution. In this view the ejector is illustrated in the course of ejecting a cap remover from the magazine;

Fig. 15 is a view similar to Fig. 14 except that it illustrates the rotor in the course of being indexed to a new position and the ejector has ejected a cap remover to its extreme outer position;

Fig. 16 is a side view of the ejector;

Figs. 17 and 18 are sectional views of the ejector taken respectively on the lines 17—17 and 18—18 of Fig. 16;

Figs. 19 and 20 are plan views respectively showing in working position and in inoperative position the frame carrying the rotor and the magazine with its ejecting mechanism;

Fig. 21 is a latch member for use particularly in the mechanism shown in Figs. 19 and 20;

Fig. 22 is a vertical section on the line 22—22 of Fig. 20 illustrating the manner in which the latch is automatically disengaged when the magazine and its rotor are not properly positioned with respect to the capping head;

Fig. 23 is a vertical section on lines 23—23 of Fig. 19;

Fig. 24 is a detailed view of the locking mechanism in the position where it locks the driving means of the rotor as well as of the ejector during such times as the frame with the rotor and ejector thereon are in inoperative position;

Fig. 25 is a vertical section on lines 24—24 of Fig. 23 further illustrating this mechanism;

Figs. 26 and 27 are respectively a plan view and an elevation of a modified form of the invention in which the frame with the magazine and rotor thereon are simultaneously adjusted with the capping head when the capping machine is set to cap bottles of a different heighth;

Fig. 28 is a fragmentary detailed view showing the manner in which the frame carrying the rotor and magazine is attached to the bracket carried by the capping head.

As shown in the drawings, the present apparatus is designed for attachment to a conventional bottle capping machine but it will be understood that the invention is not limited to the bottle capper herein illustrated, since it is applicable to other types. In the bottle capper disclosed in Figs. 1, 2 and 3 bottles are advanced in a continuous procession through a circuitous path past a capping position wherein a crown cap and a cap remover R are simultaneously applied to each bottle in succession. In the particular advancing mechanism shown, the bottles are moved along a track 5, first by a horizontally rotating, feed disc 6 having notches 7 therein of a size to engage bottles to be advanced. An arcuate guide 8 retains a bottle B in a notch 7 and as the feed disc 6 rotates, a series of bottles B is advanced along the track through the cooperation of the disc and its related guide. When a bottle of this series has reached approximately the point C, a second horizontally rotating disc 10 having notches such as 12 therein, cooperates with the notched disc 6 to continue the advance of each bottle thru the capping zone D and onward, the rotating feed disc 10 cooperating with an arcuate guide 13 to advance each bottle from the capping region. The bottles now capped, and with the cap removers R attached thereto in a manner to be described are advanced to a delivery point by a third horizontally rotating, notched disc 14 which also cooperates with the disc 10 to advance the capped bottles to a station where they can be inserted in cases for delivery.

As the series of bottles pass through the capping position, a crown cap is crimped over the lip of each bottle. In the type of capping machine herein shown for crimping crown caps on the bottles, there is included a rotatable capping head H which is provided with four capping units 15 to each of which units, crown caps are fed automatically in the well-known manner and as a bottle passes through the capping region, one of the capping units advances to a position and descends to crimp a crown cap on the lip of this bottle. The mechanism thus far referred to is well known in bottle capping machines and therefore need not be further described.

In accordance with the present invention, there is disclosed a method and apparatus for applying a bottle cap remover R to a bottle with a portion of the remover retained between the lip of the bottle and the crimped portion of the cap, the remover extending lengthwise of the neck of the bottle. With the remover applied to the bottle in this manner, it is merely necessary to swing the lower end thereof outward as well as upward and since a long leverage is thus provided, the cap can be removed with a relatively small effort, as is more fully disclosed in the mentioned Soukup application. The remover (Fig. 11) is formed from wire to provide two substantially parallel extending legs 16 with an intervening space therebetween at one end thereof and with a loop 17 at the other end thereof. It will be understood that the end portions of the legs 16 are adapted to be retained under the crimped edge of the cap.

Since these removers R are in the form of an open wire frame work, it will be appreciated that if they were dumped into a hopper or other container they would become so tangled that it would be difficult to separate a remover from the mass. In accordance with the present invention, it is proposed, as soon as each cap remover is made, to mount it with its legs 16 in straddling relation on a strip of material 19 (Figs. 11 and 14), of any convenient length, the thickness of this strip being such that the remover can be forced onto the strip with the legs thereof snugly engaging the strip. The cap removers, when thus mounted, project in close parallel relation from the strip so that a relatively large number of cap removers can be mounted on a given length of strip and yet each individual remover will be slightly spaced from its neighbors. Each strip with a series of removers mounted thereon, is adapted to be introduced into a magazine to be hereinafter described.

From this magazine, the individual removers must be withdrawn one at a time and must be transferred in properly timed relation to the capping station where a remover, along with a bottle cap, is fastened onto the lip of the bottle in the position previously described. It should be appreciated that the motion of the bottles through the capping machine is uninterrupted and since these bottles frequently travel through the machine at the rate of several hundred bottles per minute, the individual cap removers must be fed rapidly. Furthermore, since any given bottle is in the capping position for only a very brief interval, it is important that a cap remover R be presented to each bottle at exactly the right time and in exactly the right position to be lodged between the crimped margin of the cap and the lip of bottle. In achieving this result, there is mounted on the rotating head H of the capping machine, herein illustrated four uniformly spaced rotating carrier arms 25, each arm being individual to one of the four capping units 15 and being provided with a carrier 30 to engage a cap remover. The cap removers are transferred from the magazine to these arms by being forced one at a time in succession from the supporting strip 19 where the projecting loop of the lowest remover of the series is engaged by one of four hooks on a rotor 45 which is intermittently rotated in a vertical plane. There are also provided on this rotor, adjacent each of these hooks 48, retainers 49 which grip the resilient side wires of the cap remover. As the rotor intermittently rotates, or indexes, it advances the cap removers in succession to a point where each cap remover can be transferred to one of the carriers 30 on one of the carrier arms 25 which rotate with the capping head.

With this brief outline of the manner in which the cap removers are supplied one at a time to the capping machine, it will be in order to give a detailed description of the several parts of the feeding mechanism. In the multi-unit capping machine herein shown, there extends downward into the space within the capping units 15 a continuously rotating support having the cross sectional outline indicated by the dot and dash line 20 of Fig. 4. On this downwardly projecting support, there is attached a divided collar 21, 22 adapted to be clamped to the mentioned support by the bolts 23. The collar carries four set screws 24 at spaced points thereon, which screws engage the support to enable the collar to be properly centered within the capping head. The collar at four equally spaced points thereon pivotally supports the previously mentioned carrier arms 25, each arm being pivoted at an intermediate point thereof on a pivot such as 27 mounted on the collar 21. The outer end of each arm 25, as best shown in Fig. 2, is provided with a carrier 30 for gripping a cap remover R. Each carrier 30 in its leading edge is provided with a recess 31 to receive a remover. The recess has converging sides leading to a pair of opposing notches 32 into which the resilient side wires of the remover, snap on being forced back into the recess. As shown in Figs. 1 and 9, each carrier 30 also has a horizontal slot 33 in its leading edge for a purpose to be described. The other end of each carrier arm 25 is provided with a roller or follower 34 which contacts the face of a cam 35, the follower of each arm being held in contact with the cam by means of a coil spring 36, having one end engaging the bracket and its other end engaging its arm 25. The mentioned cam 35, which is also divided, rides freely in a groove 37 in the collar 21 on the capping head, the cam being prevented from rotating by its arm 38 (Fig. 2) which engages a fixed vertically extending stop bar 39. It will be seen especially from Fig. 2 that the cam has a high point 35a in the region of the capping position while the remainder thereof has a relatively low contour so that three of the four carrier arms 25 on the capping head project radially from the head. However, the fourth carrier arm 25 namely, the one in the capping position, has its follower or roller in engagement with the high point 35a of the cam so that this fourth arm has moved its carrier with a cap remover therein, away from the true radial position and against the bottle now in the capping position. This movement of the fourth arm positions a cap remover carried thereby against the lip of the bottle so that when a capping unit 15 descends to crimp a crown cap over this lip, the upper end of the cap remover will be lodged between the crimped margin of the cap and the mentioned bottle lip. It will be seen that the carrier 30 in the upper right-hand position, as viewed in Fig. 2, is now empty but it is projecting radially into a position where another cap remover can be inserted therein. However, the carriers 30 on the three remaining arms 25 are each carrying a cap remover. When the arm 25 in the capping position, rotates to a point where its roller 34 is resting on the low portion of the cam 35, this last-mentioned arm will swing back to its radial position away from the bottle just capped and since this capped bottle with the remover R thereon continues in its rotary path, its cap remover will be disengaged from the notch in the carrier 30 where it had previously been retained.

It should be repeated at this point that the carrier arms 25 together with the capping head rotate continuously as long as the capping machine is in operation. Therefore, it becomes a problem of intermittently feeding cap removers R from the magazine to the carriers 30 on the continuously rotating arms 25. It has been mentioned that the individual cap removers, after being made, are applied in straddling relation on a strip 19 of convenient length which may be several feet. This strip with a series of the wire cap removers projecting at right angles therefrom, is inserted in a vertically extending magazine 40 mounted on a frame F. This magazine, as best shown in Figs. 7 and 11, is generally rectangular in horizontal section and extends vertically for a distance sufficient to enclose a substantial part of the strip 19 with the removers thereon. The magazine includes a vertically extending bar 41 having a notch 42 therein to receive the free lateral edge of the strip 19. It will be understood that the strip 19, with the removers thereon, moves downward in this notch 42 under the action of gravity, as each successive remover is withdrawn therefrom by a suitable ejector. The ejector comprises an arcuate member 43 adapted to move on an arcuate stationary guide 44, mounted on the magazine proper. This ejector in its upper surface is provided with two tooth-like fingers 46, 46 adapted to engage the free ends of the legs 16 of a cap remover. During the operation of the feeding mechanism, the ejector moves from a position shown in dotted lines in Fig. 14 where it will engage the lowest cap remover R of the series and will force it outward away from the support 19, approximately to the position shown in Fig. 15. The ejector is now in approximately the position to begin its return excursion to the left, as viewed in Fig. 15, where its fingers 46 can engage the ends of the legs of the next remover now at the bottom of the series. In other words, the ejector oscillates back and forth in an arcuate path and in so doing presents the loops of successive removers in the position shown in Fig. 15. From this position, each cap remover must be carried to a point where it can be inserted in a notched carrier 30 secured to one of the rotating carrier arms 25 on the capping head. The mechanism for transferring the ejected cap remover to a carrier 30 on a rotating arm 25, includes a circular rotor 45 mounted on the frame F and arranged to be intermittently turned in a vertical plane adjacent the magazine. This rotor has four equally spaced cut-outs 47 in its margin through which there pass, the carriers 30 on the rotating carrier arms 25. The face of the rotor nearest the magazine is provided at one side of each cut-out with a hook 48, each hook projecting in a position to engage in turn the loop of an ejected cap remover. As best shown in Fig. 9, there is mounted on the mentioned face of the rotor at the opposite side of each cut out, a retainer 49. This retainer in its forward outstanding edge Fig. 11 is provided with a recess similar to the recess in carriers 30, the forward edge of this recess converging backward to the double notch 50—50 to serve as a guide for the legs 16 of a cap remover being inserted therein. It will be understood that as a hook 48 on the rotor turns upward, it will engage the loop of a remover now projecting from the ejector as shown in Fig. 15. The timing of these parts is such that when the hook 48 has engaged the loop of the remover on the ejector, the ejector will be moving away from the rotor to free itself from the cap remover under consideration and to move into a position where its tooth-like fingers 46 can engage the free ends of the legs of the next cap remover on the strip 19. Since there was some possibility that the loop of a remover would accidentally become disengaged from its hook 48, there is provided a latch 52 (Fig. 9), pivoted at 53 on the frame with the free end of the latch adapted to rest on one of the hooks 48 during a portion of the travel of this hook. A stop 54 on the frame limits the downward travel of the latch 52 when a hook 48 has rotated out of engagement therewith. It has been mentioned that there is a retainer 49 adjacent each hook and that the side wires or legs 16 of a cap remover are to be forced into the notches 50 of this retainer, while the loop of this remover is suspended from the related hook 48. For this purpose, there is mounted on the magazine, a relatively wide wiper plate 55 against which the legs of a cap remover bear and are thus forced into the slots 50 of the retainer as the remover in question is drawn away from the ejector. Thus, the remover, after being fed to the rotor is supported across a cut-out 47 therein by the hook 48 engaging the looped end and by the retainer 49 laterally engaging the other end portion of this remover. This will insure that each cap remover is securely held as it rotates through its top position, as shown in Fig. 9, to its left-hand location where it is stopped in a position to be transferred to a carrier 30 borne on one of the carrier arms 25 of the rotating capping head. It will be appreciated from Fig. 9 that at the time of the transfer of a cap remover from the rotor to one of the rotating carrier arms 25, one of the notched retainers 49 on the rotor will be in vertical alinement with one of the notched carriers 30 on the rotating carrier arms. Thus, as a carrier arm 25 rotates its carrier 30 through a cut-out 47 in the intermittently operating rotor, this carrier will sweep through the mentioned position of vertical alinement with a retainer 49 and hook 48 on the rotor. While the carrier 30 is passing through the position just mentioned, a finger 56 temporarily engages that face of the cap remover which is remote from the leading edge of the carrier 30. It has been mentioned that this leading edge of this carrier has a horizontal slot 33 therein (Fig. 9) through which the finger 56 temporarily extends to force the lower portion of the cap remover so that the side wires of its legs are engaged in the notches 32 of this carrier. Of course, as the carrier 30 passes through its position of vertical alinement with a carrier 49 on the rotor, the remover will be disengaged from the carrier 49 as well as from the hook 48 and will be transferred to carrier 30. It will be appreciated that the finger 56 is pivoted on a pin 57 which in turn is mounted on a bracket 58, supported on a fixed part of the frame. A coil spring extending around the pivot end 57 and having one of its ends anchored thereto, has its other end engaging the finger 56 tending to urge the left-end of this finger backward, as viewed in Fig. 5. The tension of the spring 59 should be such that the finger 56 will offer enough resistance to force the cap remover into the carrier 30 as this carrier rotates away from the position of alinement with a carrier 49. As soon as the finger 56 has forced the remover into the notch of the carrier 30 on one of the rotating arms, it is disengaged from the horizontal extending slot 33 in the support 30. It will be seen that as this carrier 30 rotates, it forces the left end of the finger 56 forward against the tension of spring 59 until the carrier clears the mentioned end of this finger. The left end of the finger 56 must also be moved forward intermittently in timed relation to the intermittent operation of the rotor so that the retainers 49 on the rotor will clear the finger. For this purpose, there is provided on the front face of the rotor a cam 61 having four high spots 62 related to each of the four positions in which the rotor stops during each complete rotation. The surface of this cam engages the right-hand end of the finger 56 (as viewed in Figs. 9, 11, 12 and 13) so that when one of the high points 62 of the cam engages the mentioned end of the finger, the left hand portion of this finger will be swung away from the rotor to clear one of the carriers 49.

It has been mentioned that the rotor is intermittently rotated and in the present arrangement, this intermittent rotation as well as the oscillation of the ejector is effected by the following mechanism. The conventional capping machine, such as that herein illustrated, has suitable driving means (not completely shown) but including a vertical driven shaft 64 (Fig. 3). This shaft has mounted thereon a beveled gear 65, meshing with a beveled gear 66. The gear 66 is secured to one end of a universal shaft 67 on the other end of which there is secured a cam 70 (Figs. 7 and 8). The periphery of cam 70 is engaged by a roller 71 mounted on one end of an indexing lever 72 which is pivoted at 73 on the frame. A coil spring 74 mounted on the pivot 73 has one end anchored at stop 75 on the frame and has its other end engaging the edge of lever 72 so that this lever is moved to a position where the roller 71 normally engages the periphery of the cam 70. The left end of the indexing lever 72 (Figs. 7 and 8) is provided with a pivoted pawl 76. This pawl is adapted to engage in succession, four pins 77 projecting from the rear surface of the rotor in such a position that in the cycle of operation of the indexing lever 72, the pawl 76 operating on a projecting pin 77, advances the rotor through a quarter revolution.

In the present arrangement (Fig. 10), provision is made so that the rotor cannot rotate backwards when the pawl 76 on the indexing lever 72 disengages the pin 77 on the rear surface of the rotor, at the conclusion of a quarter-turn movement thereof. This last mentioned means includes a latch 78 having a notch 79 normally engaging one of the pins 77 when the rotor is stationary. This latch is pivoted at 80 on the frame (Figs. 9, 10, 14 and 15), and is normally urged in a counterclockwise direction by a coil spring 81, until the lug 82 thereon engages a fixed pin 83 on the frame. The latch 78 is also provided with an arm 84 which is adapted to be engaged by the indexing pawl 76, so that the notch in the latch 78 will be disengaged from a pin 77 just prior to the time that the indexing pawl 76 engages this pin to advance the rotor through a quarter revolution.

The ejector 43, of course, must oscillate in properly timed relation to the intermittent rotation of the rotor and for this purpose the face of the cam 72 is provided with two spaced rollers 86 (Figs. 7 and 8). These rollers, in succession, engage the edge of a lever 87 which is pivoted at 90. A suitable coil spring 91 normally urges the lever 87 so that one of its edges is in engagement with one or the other of the rollers 86. The lower end of the lever 87 is pivoted to one end of a link 92, the other end of which is pivoted at 93 to one arm of a bell crank 94. This lever 94 is pivoted at 95 on the fixed part of the magazine and has its other arm pin-connected at 96 to the ejector 43.

Capping machines of the type mentioned, must be adapted to apply crown caps to bottles of different heighths. Since the rotating arms 25 with their carriers 30, which function to support the cap removers while they are being applied to the bottle, are mounted on the capping head H, these arms will therefore be adjusted at the same time that the capping head is raised or lowered to accommodate the bottles to be capped. However, as shown in Figs. 1 to 25 inclusive, the magazine and the cap remover transferring mechanism including the intermittently operating rotor for feeding removers from the magazine to the continuously rotating carriers 30 on arms 25, is not positioned by the adjustment of the capping head to different sizes of bottles. Consequently, this mechanism may be set by a separate manual adjustment. In this arrangement, the vertically movable frame F common to the magazine and to the transfer mechanism is adjustable with respect to the base by means of an internally threaded hand wheel 98, carried on the stationary base 97, which wheel cooperates with a screw 99 carried on the mentioned frame. Since the operator of a capping machine might forget to make the necessary adjustment of the hand wheel 98, when the capping head is adjusted to a different type of bottle, provision is made for automatically moving the magazine and the transfer mechanism out of operative position as shown in Fig. 2 and into inoperative position as shown in Fig. 3, in the event that the mechanism is not adjusted to the proper height for the new size of bottle being capped. This insures that the transfer mechanism will not be damaged by reason of the fact that it is not at the proper elevation to cooperate with the carrier arms 25 and their carriers 30 mounted on the capping head. This safety mechanism just mentioned comprises a vertically extending rod 100 having its upper portion bent at right angles (Fig. 3) so that its upper free end can be secured to the adjustable capping head H. Thus, as the capping head is adjusted to an elevated or to a lower position, the rod 100 will be correspondingly moved. The rod 100 is provided with one or more notches 100a (Fig. 22) therein corresponding to the positions in which the magazine and transfer mechanism are at a proper level to cooperate with the previously mentioned parts on the capping head.

The frame F, which carries the magazine and the transfer mechanism, is mounted to rotate about a vertical axis 102 so that this portion of the mechanism can swing from its normal operating position (as shown in Fig. 2) to its inoperative position (as shown in Fig. 3). This frame is normally biased to the position shown in Fig. 3 by means of a coil spring S having its right end (Fig. 23) secured to the base and its other end secured to the frame. Thus this frame, except when it is restrained, will be rotated to its inoperative position in which all of its parts will be out of the path of the rotating arms on the capping head. However, the frame is normally retained in its operative position by a latch 103 having the outline indicated in Fig. 21 and including a handle 104. This latch is pivoted at 106 on the base and its end 105 is adapted normally to engage a stop 107 (Fig. 19) on the frame. The latch is also provided with a beveled edge portion 108 adapted to enter one of the notches 100a in the rod 100 (Fig. 22), when the notch 100a and the mentioned beveled portion 108 are in registry. It will be understood that this condition prevails when the frame with its magazine and transfer mechanism are at the proper elevation to cooperate with the elements on the capping head. If, however, the frame is not at the proper level or if the handle 104 of the latch is moved in a clockwise direction, the beveled portion 108 of the latch will be disengaged from a notch 100a in the mentioned rod 100. Consequently, the latch will be moved to the position shown in Fig. 20 wherein its end portion 105 will be disengaged from the stop 107. The biasing spring will therefore rotate the frame counterclockwise to its inoperative position. The absence of cap removers on the capped bottles will indicate to the operator that the hand wheel must be rotated to adjust the frame with its magazine and transfer mechanism to the proper elevation. When these parts are at the proper level, the frame F is manually swung clockwise about the axis 102 until the end 105 of the latch engages the stop 107 at which time the beveled portion 108 of the latch is in engagement with the notch 100a in the rod 100. It will thus be appreciated that the magazine and transfer mechanism can be rendered inoperative by swinging the latch clockwise to the position shown in Fig. 20 which result may be caused either by improper adjustment of the frame or by manual operation of the handle 104.

When the magazine and transfer mechanism are in inoperative position, provision must be made to prevent the cap removers from being ejected from the magazine and for preventing the needless operation of the rotor. To this end, both the ejector on the magazine and the indexing lever which normally advances the rotor by a quarter-revolution, are disabled (Figs. 24 and 25). This arrangement includes a hook 109 which at this time engages a pin 110 on the end of the indexing lever 72, while a latch 111 has its end projecting in the path of a pin 112 carried by the operating link 92 of the ejector so that this lever and link cannot be moved to the left beyond the position illustrated in Fig. 24. This hook 109 and the latch 111 which are separated by a sleeve 112, are rotatable on shaft 113 carried by the frame. The hook 109 and the latch 111 are normally held in the position shown in Figs. 7 and 8 by means of leaf springs 114a and 114b (Figs. 24 and 25). These springs have two adjacent ends respectively engaging notches in the latch and hook while their other ends are secured to one end of a horizontal shaft 116 rotatable on suitable bearings on the frame. The other end of this shaft (Figs. 19, 20, 23 and 25) is provided with a downwardly projecting pin 117 which extends into an arcuate slot 120 formed in a portion of the base. By this arrangement, when the frame with the magazine and the transfer mechanism thereon, is swung counterclockwise to its inoperative position (shown in Fig. 3), the pin 117 as it travels in the arcuate slot 120, rotates the shaft 116. The rotation of this shaft causes leaf springs 114a and 114b attached thereto to swing the latch 111 to obstruct the path of the pin 112 of the ejector operating link 92 and to swing the hook 109 to engage the pin 110 on the indexing lever. By this arrangement, the link cannot move the ejector to a position wherein it ejects a cap remover from the magazine and the index lever cannot advance the rotor. However, when the frame is moved to its operative position as shown in Fig. 19, the shaft 116 will be rotated clockwise and the leaf springs 114a and 114b will cause the hook 109 to be disengaged from the pin 110 and the latch 111 to be removed from the path of the pin 112 on the ejector link. At this time the mentioned parts will be in the position shown in Fig. 7 wherein the cap removers will be ejected from the magazine and will be carried to the capping head by the transfer mechanism including the rotor, all as previously described.

In the event that a bottle is absent from the capping station D, when a rotating carrier arm 25 and its carrier present a cap remover to this position, provision must be made for taking the cap remover out of the carrier 30, since otherwise a second cap remover might be jammed therein when this carrier is in registry with a carrier 49 on the rotor. The mentioned unused cap remover is knocked from the mentioned carrier 30 by means of a bar 123 (Figs. 1 and 2) which projects from the frame in a position to engage such an unused cap remover and to force it from its carrier 30.

In certain installations it is desirable to have an arrangement wherein the vertical adjustment of the capping head to different bottle heights, effects the simultaneous adjustment of the magazine unit to the appropriate cooperating position. Thus, there is no possibility of an operator failing to set the magazine unit in proper relation to the capping head. Such an arrangement is provided in the modified form of the invention shown in Figs. 26, 27 and 28. In this modified construction, the frame F which carries the rotor, as well as the magazine with its ejector, together with the driving means therefore, are supported on the lower end of the bracket 120. The upper end of this bracket is secured to the normally stationary part 121 on the capping machine which part, however, is adjustable along with the capping head when bottles of a different height are to be capped. In this modified arrangement the hand wheel 98 and the cooperating screw 99 (Figs. 7 and 23) are omitted. These parts are are replaced by a vertically extending guide rod 123 on the frame which is received in a guideway 124 on the base 97. In this construction, the latch 103 is effective, as before, to release the frame F with its magazine and rotor mechanism so that the coil spring S moves these parts to the inoperative position shown in Fig. 3. In this instance, however, the operation of the latch is effected manually since the rod 100 with its notches 100a have been omitted. It will be understood that, when the frame is moved to its inoperative position the ejector and the rotor will be maintained inoperative by the previously described mechanism disclosed in Figs. 24 and 25.

While the present disclosure shows bottles and a bottling machine, this invention is not to be so limited since it is applicable to various containers utilizing crown caps as closures. It should, therefore, be understood that the terms "bottle" and "container" are used synonomously herein.

What I claim is:

1. The method of applying crown caps and cap removers to a series of bottles which method comprises moving each bottle in succession in a given path through a capping position, moving a series of cap removers in succession through a second path in part paralleling and then merging with said first mentioned path approximately at said capping position and against the lips of successive bottles in the capping position, and crimping a cap on the lip of each bottle in the capping position with a portion of a cap remover embraced between the crimped margin of the cap and the lip of the bottle.

2. The method of applying crown caps and cap removers to a series of bottles which method comprises moving each bottle in succession uninterruptedly in a given path through a capping position, moving a series of cap removers in succession through a second path in part paralleling and then merging with said first mentioned path and against the lips of successive bottles in the capping position, and crimping a cap on the lip of each bottle in the capping position with a portion of a cap remover embraced between the crimped margin of the cap and the lip of the bottle.

3. The method of applying crown caps and cap removers to a series of bottles, which method comprises moving a series of bottles in succession thru an arcuate path including a capping position, moving a series of cap removers in a second arcuate path paralleling a portion of said first path, diverting said series of removers in succession from said second path into said first path against the lips of successive bottles in said capping position, and crimping a cap on each bottle in said capping position with a cap remover lodged between the lip of the bottle and the crimped portion of the cap.

4. The method of applying crown caps and cap removers to a series of bottles, each cap remover having a loop at one end and spaced legs at the other end thereof which method comprises drawing said removers from a stack by engaging the loops thereof in succession, conveying each cap remover in turn to a given point thru an arcuated path in a vertical plane to position the legs of each cap remover at the top thereof, bringing the legs of a cap remover thus positioned against the lip of a bottle, and crimping the skirt of a cap over the ends of said legs and over the lip of said bottle.

5. The method of applying crown caps and cap removers to a series of bottles, each cap remover having a loop at one end and spaced legs at the other end thereof which method comprises drawing said removers from a stack by engaging the loops thereof in succession, conveying each cap remover in turn to a given point thru an arcuated path in a vertical plane to position the legs of each cap remover at the top thereof, conveying each cap remover thus positioned, in an arcuate horizontal path leading from said point to a bottle against the lip of which the legs of the cap remover are placed, and crimping the skirt of a cap over the ends of said legs and over the lip of said bottle.

6. The method of applying crown caps and cap removers to a series of bottles which method comprises advancing the bottles through a predetermined course including a capping portion, advancing a series of cap removers along a second course having a portion closely paralleling said capping portion with a part of a cap remover against the lip of each bottle in said capping portion, the rate of advance of said cap removers along the mentioned portion of said second course being substaintially equal to the rate of advance of said bottles along the mentioned portion of said first course whereby a cap remover travels with each bottle during a given interval, and securing a crown cap over a part of the cap remover and on the lip of a bottle during this interval.

7. The method of applying crown caps and cap removers to a series of bottles which method comprises advancing the bottles through a predetermined course including a capping portion, advancing a series of cap removers along a second course including a part defined by a vertical plane and a part defined by a horizontal plane, said second course having a portion closely paralleling said capping portion with a part of a cap remover against the lip of each bottle in said capping portion, the rate of advance of said cap removers along the mentioned portion of said second course being substantially equal to the rate of advance of said bottles along the mentioned portion of said first course whereby a cap remover travels with each bottle during a given interval, and securing a crown cap over a part of the cap remover and on the lip of a bottle during this interval.

8. In combination, a capping mechanism having a rotatable head provided with a plurality of cap applying units carried therewith for rotation through a capping position, means for rotating said head and for advancing bottles through said position, a cap remover carrier individual to each unit and normally rotatable in spaced relation thereto, means for supplying a cap remover to each carrier as it rotates through a given point, means effective as each cap remover carrier rotates through the capping position for moving this carrier toward its unit as well as toward the bottle in the capping position whereby a cap remover supported thereon is positioned adjacent the lip of its bottle, and means for actuating the unit in the capping position to apply a cap embracing the cap remover and the lip of the bottle in this position.

9. In combination, a capping mechanism having a rotatable head provided with a plurality of cap applying units carried therewith for rotation through a capping position, means for advancing bottles through said position as said head rotates, a carrier arm pivoted on said head adjacent each unit and normally projecting from said head, the free end of each carrier arm terminating in a carrier adapted to support a cap remover, means related to said capping position for swinging a carrier arm to position its carrier adjacent the neck of a bottle whereby a cap remover supported in said carrier is held against the lip of a bottle in the capping position, means for supplying cap removers to said carriers, and means on each unit for crimping a cap and the end portion of the cap remover on the lip of the bottle in the capping position.

10. In combination, a capping mechanism having a rotatable head provided with a plurality of capping units carried therewith for rotation through a capping position, means for rotating said head and for advancing bottles through said position as said head rotates, a carrier arm pivoted on said head adjacent each unit for rotation therewith and normally projecting from said head, the free end of each carrier arm terminating in a carrier adapted to support a cap remover, means related to said capping position for swinging a carrier arm to position its carrier adjacent the neck of a bottle whereby a cap remover supported in said carrier is held against the lip of a bottle in the capping position, a source of cap removers, means for delivering cap removers in succession from said source, means including a rotor for conveying a delivered remover to each of said carriers, and means actuating each unit for sealing a cap on the bottle in the capping position with the end portion of the cap remover held on the lip of said bottle by said cap.

11. In combination, a capping mechanism having a rotatable head provided with a plurality of capping units carried therewith for rotation through a capping position, means for rotating said head and for advancing bottles through said position as said head rotates, a carrier arm pivoted on said head adjacent each unit for rotation therewith and normally projecting from said head, the free end of each carrier arm terminating in a carrier adapted to support a cap remover, means related to said capping position for swinging a carrier arm to position its carrier adjacent the neck of a bottle whereby a cap remover supported in said carrier is held against the lip of a bottle in the capping position, a source of cap removers, means including an ejector for delivering cap removers from said source one at a time, a member having at least one pair of spaced supports for engaging a delivered cap remover adjacent each end thereof, means for moving said member to a position wherein a carrier passes between said pair of supports to disengage the cap remover from said supports and for gripping an intermediate portion thereof, and means on each unit for crimping a cap over the end portion of the cap remover and the lip of the bottle in the capping position.

12. In combination, a capping mechanism having a rotatable head provided with a plurality of capping units carried therewith for rotation through a capping position, means for rotating said head and for advancing bottles through said position as said head rotates, a carrier arm pivoted on said head adjacent each unit for rotation therewith and normally projecting from said head, the free end of each carrier arm terminating in a carrier adapted to support a cap remover, means related to said capping position for swinging a carrier arm to position its carrier adjacent the neck of a bottle whereby a cap remover supported in said carrier is held against the lip of a bottle in the capping position, a source of cap removers, means including an ejector for delivering cap removers from said source one at a time, a rotor having uniformly arranged around its margin a number of pairs of spaced supports related to the number of said carriers, each pair of supports serving to engage a delivered cap remover adjacent each end thereof, means for rotating said rotor to position each pair of supports in straddling relation to a point in the path of said rotating carriers whereby a carrier disengages a cap remover from the pair of supports at said point and grips its intermediate portion, and means on each unit for crimping a cap over the end portion of the cap remover and the lip of the bottle in the capping position.

13. In combination, a capping mechanism having a rotatable head provided with a plurality of capping units carried therewith for rotation through a capping position, means for rotating said head and for advancing bottles through said position as said head rotates, a carrier arm pivoted on said head adjacent each unit for rotation therewith and normally projecting from said head, the free end of each carrier arm terminating in a carrier adapted to support a cap remover, means related to said capping position for swinging a carrier arm to position its carrier adjacent the neck of a bottle whereby a cap remover supported in said carrier is held against the lip of a bottle in the capping position, a magazine for cap removers, means for delivering cap removers in succession from said magazine, means including a rotor for conveying a delivered remover to each of said carriers, means on each unit for crimping a cap over the end portion of the cap remover and the lip of the bottle in the capping position, and a common adjustable support for said head as well as for said magazine and said rotor whereby said device can be adjusted to apply crown caps and cap removers to bottles of different heights.

14. The combination with a container capping machine in which successive containers are brought to a capping position and caps sealed thereon, of mechanism comprising means for selecting and transporting cap removers to said capping position, and means including a portion of said first means for holding and introducing one of said cap removers between a container and a cap as it is sealed thereon whereby the cap remover is gripped therebetween.

15. In combination with a capping machine provided with means for feeding a cap to and for crimping the same on the lip of each bottle, and means for advancing bottles to said crimping means, of a source of cap remover, mechanism for selecting cap removers from said source, means for conveying to and for holding a selected remover with a portion thereof against the lip of a bottle to be capped, and mechanism for actuating said conveying means and for operating said crimping means to seal a cap on the lip of said last-mentioned bottle with the portion of the remover thereon embraced by said cap.

16. In combination with a capping machine provided with means for feeding a cap to and for crimping the same on the lip of each bottle, and means for advancing bottles to said crimping means, of a source of cap removers, mechanism for selecting cap removers from said source, means for conveying to and for holding a selected remover with a portion thereof against the lip of a bottle to be capped, and mechanism for actuating said conveying means and for operating said crimping means to seal a cap on the lip of said last-mentioned bottle with the portion of the remover thereon embraced by said cap, said conveying means during a portion of its course traveling along with said last-mentioned bottle.

MAXWELL H. HILL.